United States Patent
Lohmann, Jr.

[15] 3,689,495
[45] Sept. 5, 1972

[54] SYNTHESIS OF CRYSTAL VIOLET
[72] Inventor: George Y. Lohmann, Jr., 110 Bidwell Parkway, Buffalo, N.Y. 14222
[22] Filed: Sept. 4, 1969
[21] Appl. No.: 855,359

[52] U.S. Cl. ................................................260/391
[51] Int. Cl. ............................................C09b 11/12
[58] Field of Search.....................................260/391

[56] References Cited
UNITED STATES PATENTS
1,402,195   1/1922   Trumbull...................260/391

Primary Examiner—Lorraine A. Weinberger
Assistant Examiner—L. Arnold Thaxton
Attorney—Sommer & Weber

[57] ABSTRACT

A triphenyl methane dye, particularly crystal ciolet, is synthesized by reacting an aniline, particularly N, N-dimethyl aniline, with a carbon tetrahalide, particularly carbon tetrachloride, in the presence of aluminum chloride as a catalyst.

2 Claims, No Drawings

SYNTHESIS OF CRYSTAL VIOLET

BACKGROUND OF THE INVENTION

1. Field of the Invention

This invention relates to a new and improved process of synthesizing a triphenyl methane dye, and more particularly crystal violet.

2. Description of the Prior Art

Previous processes of synthesizing crystal violet, $C(C_6H_4N[CH_3]_2)_3Cl$ or $C[PhNMe_2]_3Cl$, include the following:

1. condensing Michler's ketone, $[(CH_3)_2NC_6H_4]_2CO$, with N, N-dimethyl aniline, $PhNMe_2$, in the presence of phosphorous oxychloride, $POCl_3$, P. Karrer, Berichte, 50, 1497 (1917);

2. adding chloropicrin to $PhNMe_2$, heating the reaction mixture to 100°C. and using aluminum chloride, $AlCl_3$, as a catalyst, H.L. Trumbell et al., U.S. Pat. No. 1,402,195 (1922);

3. pouring 7 parts phosgene, $(COCl_2)_2$; gradually into a solution of one part $Al_2Cl_6$ and 10 parts $PhNMe_2$, I.N. Postovski; J. Chem. Ind. (Moscow), 4, 552 (1927);

4. condensing p-bromoaniline, $BrC_6H_4NH_2$, with dimethylaminobiphenyl, $[CH_3]_2NC_6H_4OH$, in the presence of sodium, Na, Morton et al., U.S. Pat. No. 2,029,830 (1936); and 5. mixing phenyl sulfonyl chloride, $PhSO_2Cl$, and $PhNMe_2$ in bomb tubes, Harner and Nickel, Amm., 597, 20–47 (1955). The principal difficulty with these processes is that they are both time consuming and expensive.

SUMMARY OF THE INVENTION

Accordingly, it is a primary objective of the present invention to provide a process of quickly and economically synthesizing a triphenyl methane dye having the general formula

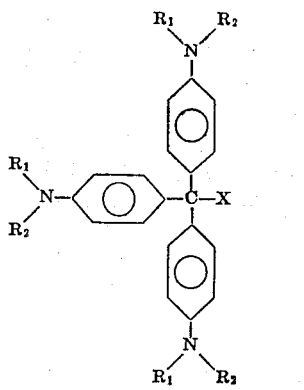

wherein X is a halogen selected from the group consisting of chlorine or bromine and $R_1$ and $R_2$ are members of the group consisting of hydrogen, methyl and ethyl, including the steps of reacting an aniline of the general formula

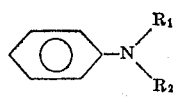

with a carbon tetrahalide having the general formula $CX_4$ in the presence of aluminum chloride as a catalyst, and thereafter separating the dye from the reaction mixture. The reaction proceeds according to the overall equation:

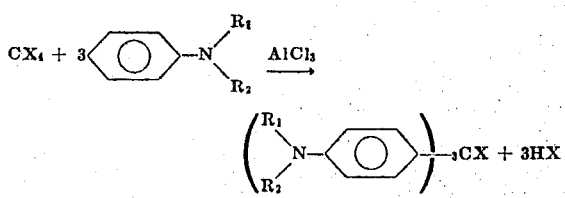

a possible mechanism for which is as follows:

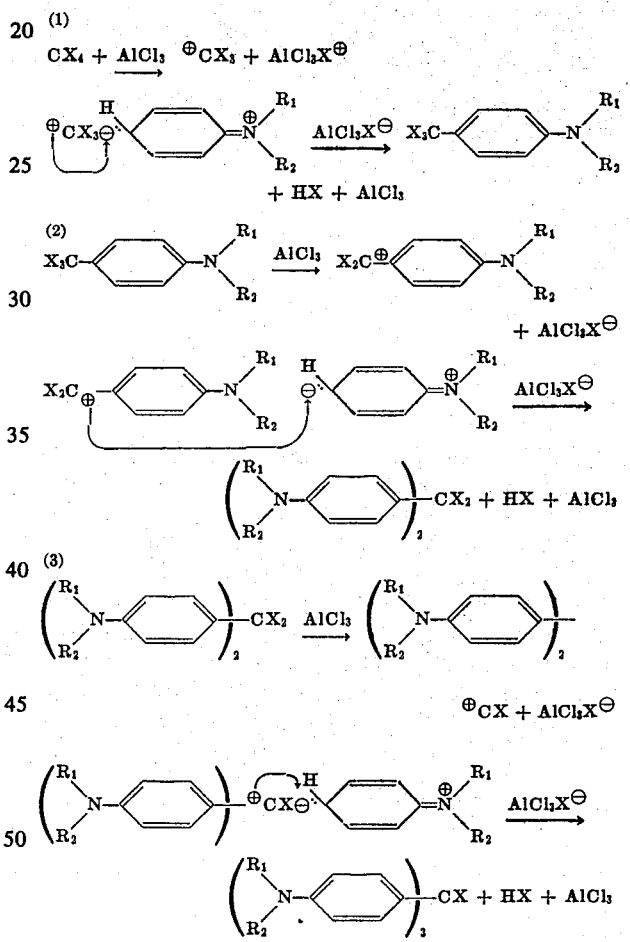

The end products of the foregoing reaction are the following dye salts, which are either bromides or chlorides depending upon whether $CBr_4$ or $CCl_4$ is employed: pararosaniline from aniline; trimethyl pararosaniline from N-methyl aniline; triethyl, trimethyl pararosaniline from N-methyl, N-ethyl aniline; hexaethyl pararosaniline (ethyl violet) from N, N-diethyl aniline, and hexamethyl pararosaniline (crystal violet or CV) from N, N-dimethyl aniline. These dyes then may be separated from the reaction mixture by any suitable known procedure.

DESCRIPTION OF THE PREFERRED EMBODIMENT

While the inventive process facilitates the synthesis of each of the above triphenyl methane dyes, it is particularly adapted to quickly and economically synthesize crystal violet. Accordingly, in the preferred specific embodiment of the invention, the dye formula becomes:

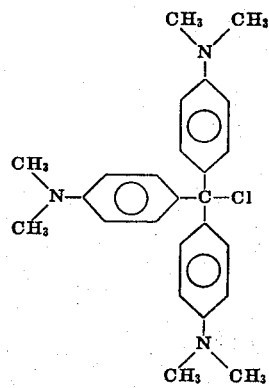

wherein the reactants are N, N-dimethyl aniline and carbon tetrachloride. The latter is particularly beneficial because it is not only highly reactive with the aniline to minimize the reaction time, but also readily available at low cost.

The reaction proceeds in accordance with the overall equation:

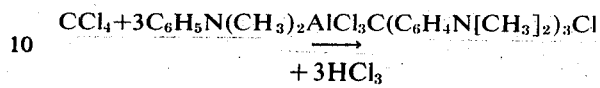

which also may be written as:

and is carried out at a temperature in the range from about 50°C. to about 80°C. for a time of not more than about 30 minutes, with at least about 1 mole of $CCl_4$ and at least about one-half mole of $AlCl_3$ being employed for about 3 moles of $PhNMe_2$. The possible mechanism for the reaction is as follows:

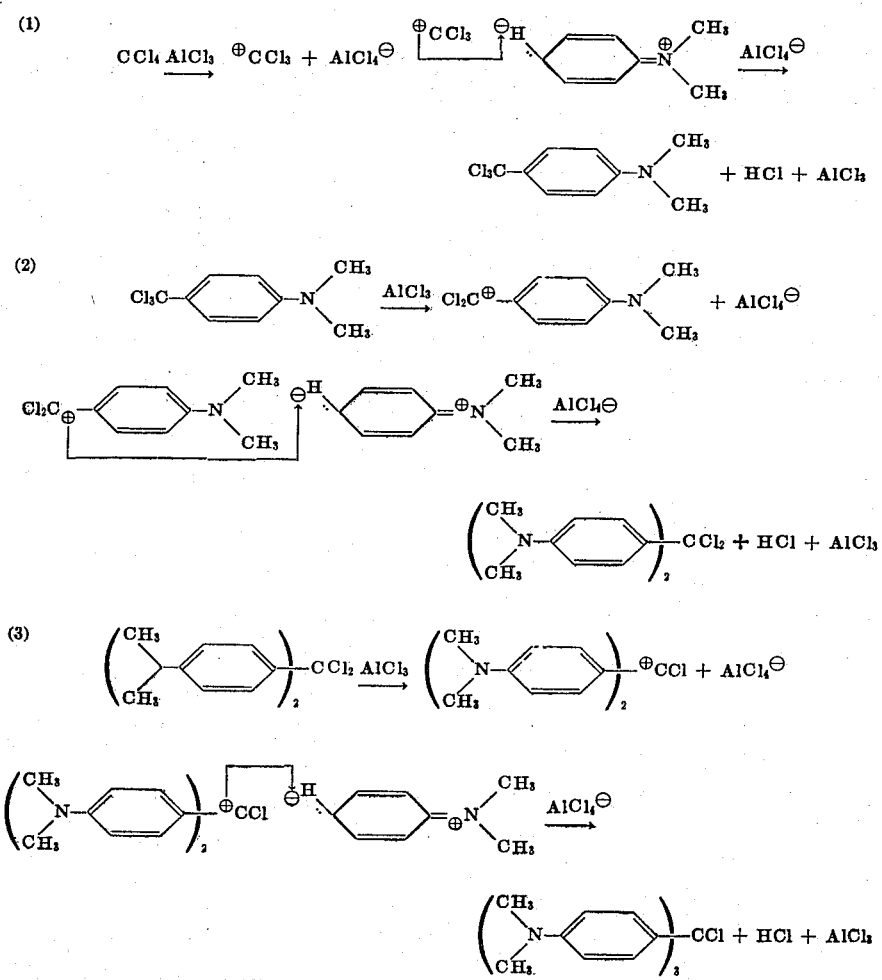

The foregoing synthesis for CV was discovered while attempting to synthesize N, N-dimethyl aminotriphenyl chloride, in accordance with the following examples.

EXAMPLE I

To 5 gms. (.05 mole) of $AlCl_3$ and 15.3 gms. (0.1 mole) of $CCl_4$, which were heated to 70°C. was slowly added 36.3 gms. (0.3 mole) $PHNMe_2$. After all the $PhNMe_2$ was added, the reaction mixture was heated at 70°–80C. for an additional 15 minutes, stirring continuously until the reaction was complete in a total time of not more than about 20–30 minutes. The reaction mixture was poured onto 40 gms. of crushed ice, with the CV going into the aqueous layer. The organic layer was washed until it was no longer blue, the total amount of water used being about 100 mls.

After washing the aqueous layer with ether to remove any traces of reactant, the aluminum salts were removed by precipitation with sodium bicarbonate as $Al(OH)_3$. The solution then was boiled to dryness, the CV redissolved in ethanol, filtered, and recrystallized from the ethanol by adding ether. Gold-green crystals were obtained and proven to be CV by ultra violet spectrophotometry.

EXAMPLE II

The same reaction procedure was followed as for Example I. However, the CV was obtained in the form of the carbinol by steam distilling the reaction mixture to remove excess $PhNMe_2$, adding NaOH to form $Al(OH)_4^-$ and the carbinol, which was filtered off as a white precipitate. This was then recrystallized from ether. About a 66 percent yield of crude crystals were obtained and proven to be CV by ultra violet spectrophotometry.

What is claimed is:

1. The process of synthesizing a triphenyl methane dye having the general formula

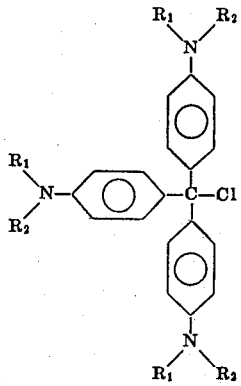

wherein $R_1$ and $R_2$ are members of the group consisting of hydrogen, methyl and ethyl, including the steps of reacting an aniline of the general formula

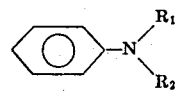

with carbon tetrachloride in the presence of aluminum chloride as a catalyst, the reaction proceeding according to the overall equation:

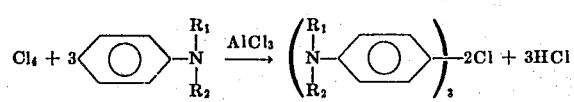

and being carried out at a temperature of at least about 50°C. for a time of not more than about 30 minutes, and thereafter separating said dye from the reaction mixture.

2. The process of synthesizing crystal violet having the formula

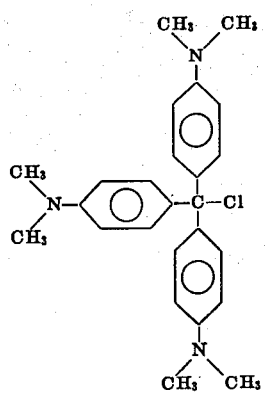

including the steps of reacting N, N-dimethyl aniline with carbon tetrachloride in the presence of aluminum chloride as a catalyst, the reaction proceeding according to the overall equation:

$$CCl_4 + 3C_6H_5N(CH_3)_2 \xrightarrow{AlCl_3} C(C_6H_4N[CH_3]_2)_3Cl + 3HCl$$

and being carried out at a temperature in the range from about 50°C. to about 80°C. for a time of not more than about 30 minutes.

* * * * *

UNITED STATES PATENT OFFICE
CERTIFICATE OF CORRECTION

Patent No. 3,689,495        Dated September 5, 1972

Inventor(s) George Y. Lohmann, Jr.

It is certified that error appears in the above-identified patent and that said Letters Patent are hereby corrected as shown below:

In ABSTRACT, first line, "ciolet" should read --violet--.

Column 2, line 21, "⊕" (second occurrence) should read -- ⊖ --.

Column 4, line 11, "+3HCl$_3$" should read --+3HCl--.

Column 5, line 8, "PHNMe$_2$" should read --PhNMe$_2$--.

Column 5, line 10, insert "°" after "80".

Column 6, line 16, Claim 1, "2Cl" should read --Cl--.

Column 6, line 54, omit the period and insert --, and thereafter separating said crystal violet from the reaction mixture.--.

Signed and sealed this 8th day of May 1973.

(SEAL)
Attest:

EDWARD M. FLETCHER, JR.        ROBERT GOTTSCHALK
Attesting Officer        Commissioner of Patents